Sept. 25, 1934. W. F. OLIVER 1,974,467
HYDRAULIC BRAKE MECHANISM
Filed Dec. 12, 1931 2 Sheets-Sheet 1
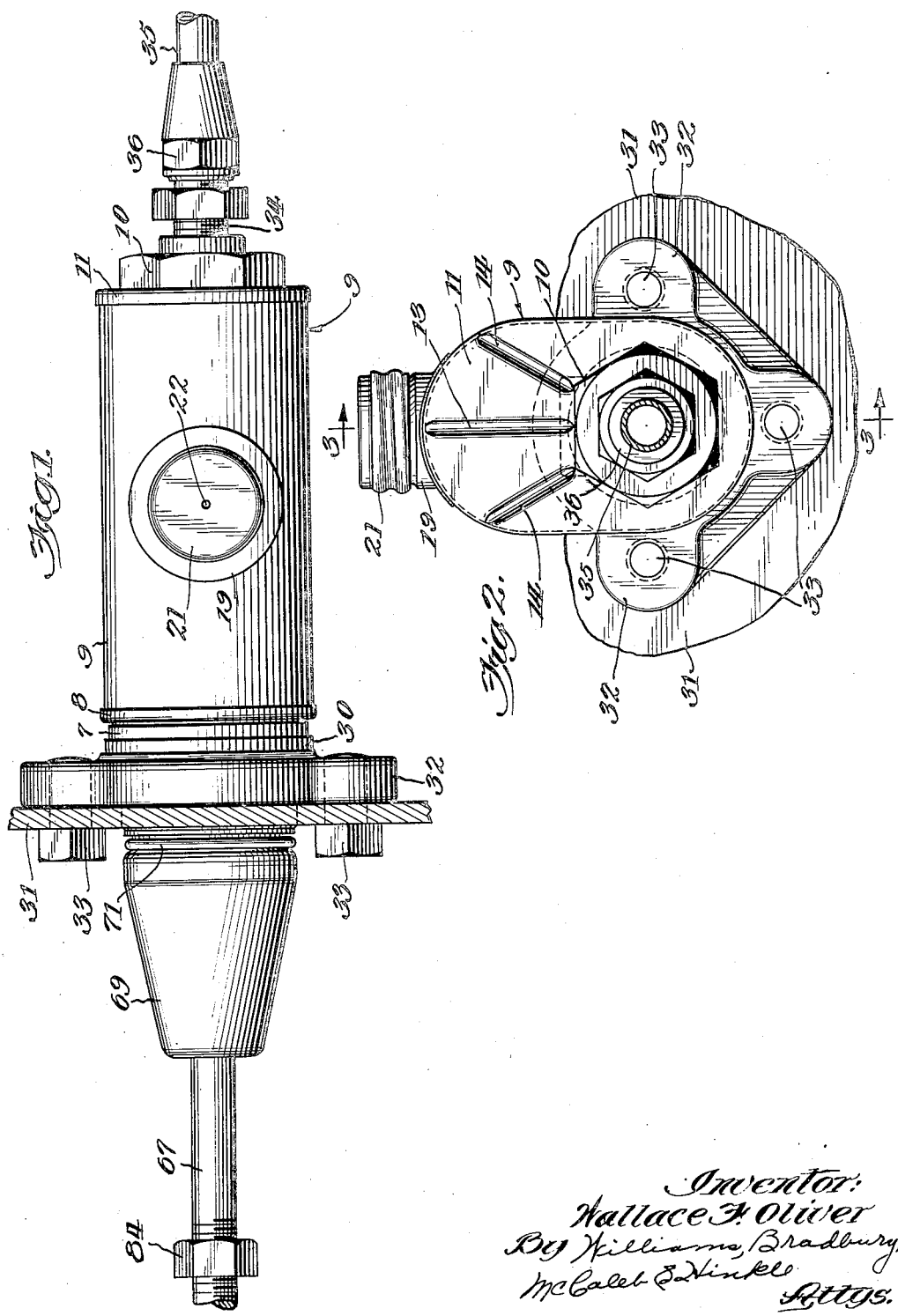
Inventor:
Wallace F. Oliver
By Williams, Bradbury,
McCaleb & Hinkle
Attys.

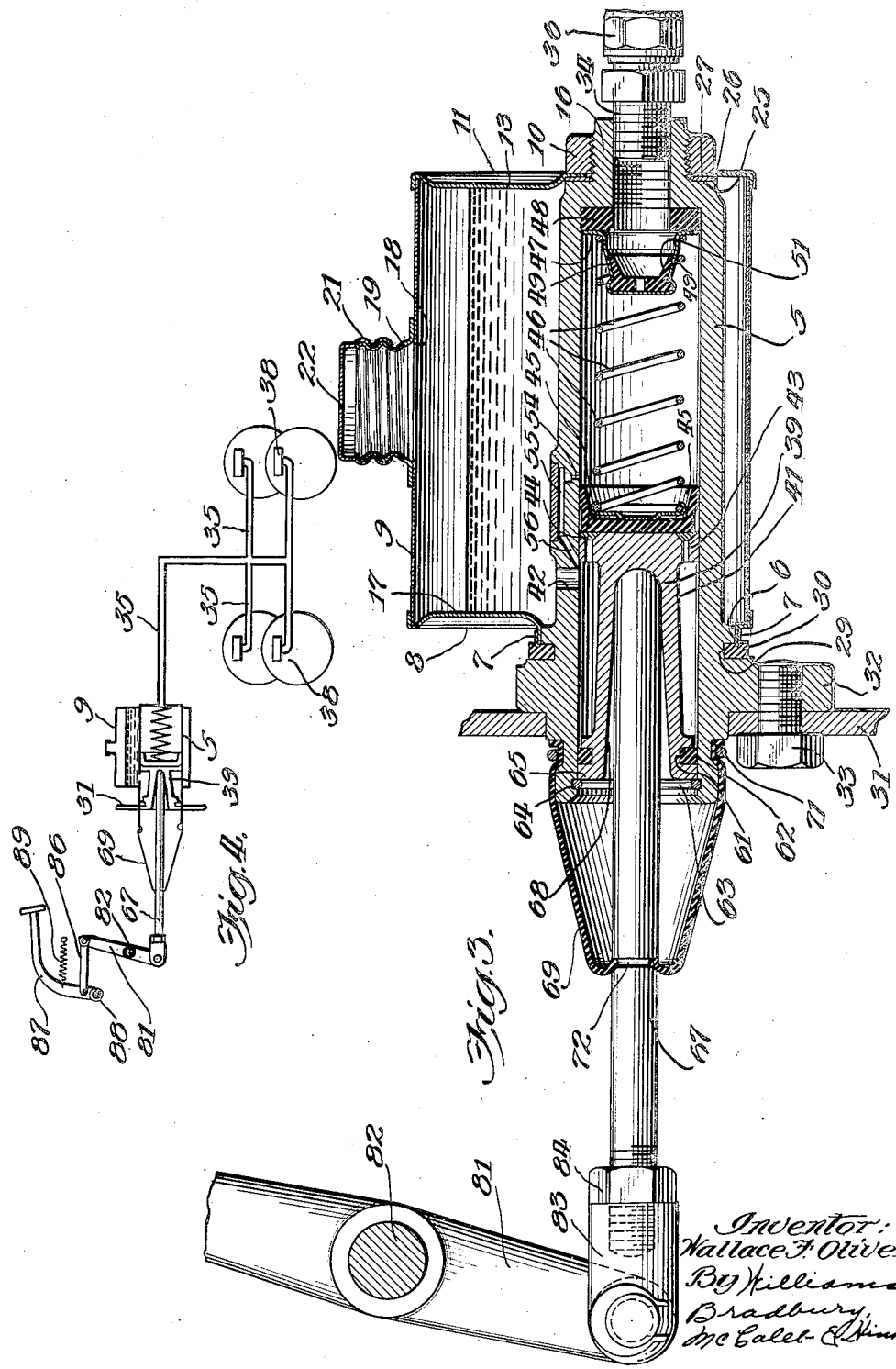

Patented Sept. 25, 1934

1,974,467

UNITED STATES PATENT OFFICE 1,974,467

HYDRAULIC BRAKE MECHANISM

Wallace F. Oliver, Detroit, Mich., assignor to Hydraulic Brake Company, Detroit, Mich., a corporation of California Application December 12, 1931, Serial No. 580,574

6 Claims. (Cl. 60—54.6)

This invention relates to hydraulic brake mechanism and more particularly to a novel combination comprising a master cylinder and fluid reservoir associated therewith.

An object of this invention is the provision of an improved and novel combination of the above identified character which is economical to manufacture, very simple of construction and readily replaceable.

Another object is the provision of a simplified brake mechanism which is automatically supplied with operating fluid without the use of the usual type of heavy cast reservoir construction and which is automatic in operation.

Another object is the provision of a master cylinder so formed and associated with a fluid supply reservoir that the reservoir may be slipped onto one end of the cylinder and clamped into position to be wholly supported by the master cylinder, there being means associated with the cylinder and reservoir to form a fluid tight union therebetween.

A further object is the provision of a sheet metal reservoir for a hydraulic brake mechanism, which reservoir is provided with reenforcements to increase its rigidity without the necessity of using a heavy gauge material and which reservoir is so constructed as to be adapted for mounting directly on the master cylinder which it supplies with fluid and to be wholly supported thereby.

Other objects and advantages will become apparent from the following description.

In the drawings,

Fig. 1 is a plan view of a master cylinder and reservoir for a brake mechanism incorporating my invention;

Fig. 2 is an end elevation of that shown in Fig. 1;

Fig. 3 is a longitudinal section taken on the line 3—3 of Fig. 2; and

Fig. 4 is a diagrammatic illustration, showing my invention as applied to a hydraulic braking system.

The master cylinder 5 is preferably formed with an annular rib 6 which is of greater diameter than any point on the cylinder to the right thereof as viewed in Fig. 3 such that the mounting flange 7 on the end 8 of the reservoir 9 will fit thereon and will pass over all portions of the cylinder toward the right so that it may be removed from its normally mounted position when the nut 10 is removed.

The opposite ends 8 and 11 of the reservoir are substantially flat and preferably of oval formation. The end 11 is preferably provided with reenforcing corrugations 13 and 14 radiating from the opening in the end through which the threaded portion 16 of the cylinder extends. The end 8 is similarly provided with reenforcing corrugations 17 radiating from the mounting flange 7. In order that the reservoir may be readily filled with fluid I have provided an opening 18 in the upper side which opens into a concentrically fixed boss 19 which has threads pressed thereon for the reception of a cap member 21 having an air vent 22 therein. The curved portion of the reservoir is preferably secured to the boss 19 and to the ends 8 and 11 by means of soldering or welding in any well known manner.

The master cylinder 5 is provided with a shoulder 25 adjacent one end on which is seated a gasket 26 for forming a fluid tight seal between the marginal portion 27 of the reservoir about the opening through which the threaded portion 16 of the cylinder extends and the shoulder 25. This fluid tight seal is effected by reason of the force exerted against the marginal portion 27 by the nut 10 on the portion 16. The cylinder 5 is also provided adjacent its opposite end with a recess 29 in which is fitted a gasket 30 of rubber or the like against which is forced the outer edge of the flange 7 when the nut 10 is tightened into position for effecting a fluid tight seal between the cylinder and the end 8 of the reservoir.

The master cylinder 5 is provided with a flange 32 preferably integral therewith, which flange is fixed to a bracket or the like 31, rigid with a vehicle not shown, by set screws 33, and whereby the cylinder is rigidly secured in position independently of the reservoir. The outlet end of the cylinder is adapted to receive a hollow stud 34 to which may be secured by a fixture 36, a suitable pipe 35 leading to the wheel cylinders 38, where fluid pressure therein is utilized in the application of hydraulic brakes in any well known manner.

The cylinder 5 is provided with a piston 39 having a recessed annular portion 41 which communicates with the reservoir 9 through the port 42. Passageways 43 extend through the piston and are normally closed by a metal ring 44 on which is seated the rubber cup 45 normally held in position by fluid pressure within the cylinder and by the aid of the coil spring 46. The forward end of the spring 46 engages a metal valve member 47 and presses the same against a gasket 48 for making a fluid tight seal between the valve member 47 and the gasket 48, when the piston 39 is being moved forwardly.

When pressure is built up in the cylinder, fluid will pass through the ports 49 pressing the rubber valve member 51 off from the ports 49 to permit fluid to pass into the pipe line 35. When the pressure on the piston is relieved it returns to its normal position shown in Fig. 3 and fluid under pressure in the pipe line 35 lifts the valve member 47 off from its seat, allowing fluid to escape into the cylinder. Gases which may find their way into the braking system may pass out of the cylinder 5 through the vent 54 and through the passageways 55 and 56 to the port 42 and thus to the reservoir 9. In the normal operation of the master cylinder, the piston 39 returns to its normal position more rapidly than fluid returns to the master cylinder from the pipe line 35 and in this event the cup 45 bends forwardly allowing fluid to pass through the passageways 43 in the cylinder head, lifting the ring 44 from its seat and escaping into the forward portion of the master cylinder by the edges of the cup 45.

The rear end of the piston 39 is provided with a recess 61 having a suitable packing 62 therein for preventing the escape of fluid out of the end of the cylinder. A ring 63 is preferably fitted into a recess 64 to form a stop engageable with the rear end 65 of the piston when in its normal position. For the purpose of actuating the piston forwardly I preferably provide a piston rod 67 seated within the tapered recess 68 in the body of the cylinder. The piston rod 67 is provided with a flexible boot 69 which is held in place on one end of the master cylinder by a ring member 71. The other end of the boot engages within an annular recess 72 in the piston rod, preventing dirt and moisture from gaining access to the working parts of the master cylinder and piston therein. The piston rod 67 may be actuated by suitable leverage mechanism comprising an arm 81 mounted on a fixed pivot 82 and pivotally connected at its lower end to an adjusting element 83 locked in place on the end of the piston rod by a nut 84. The upper end of the arm 81 is pivoted to a link 86 which is in turn pivotally connected to a foot lever 87 mounted on a fixed pivot 88 and normally held in a retracted position by a coil spring 89.

The operation of my invention has been fully set forth together with its description and it is believed that further discussion of the operation would be unnecessary. It is conceivable that many changes may be made in the mechanism illustrated in the drawings and herein described without departing from the principle of this invention and I desire to avail myself of all changes and modifications which come within the scope of the appended claims.

I claim as my invention:

1. In a hydraulic brake mechanism in combination, a master cylinder, means for rigidly supporting said cylinder, a fluid reservoir communicating with, mounted on and supported by said cylinder, said reservoir having aligned openings in opposite ends to receive said cylinder, portions on said cylinder being of such size and shape to fit within the openings, and means for sealing marginal portions of the reservoir about the openings of said cylinder for making a fluid tight union of the cylinder and reservoir.

2. In a hydraulic brake mechanism in combination, a master cylinder, means for rigidly supporting said cylinder, a fluid reservoir communicating with, mounted on and supported by said cylinder, said reservoir having aligned openings in opposite ends to receive said cylinder, and means for sealing marginal portions of the reservoir about the openings to said cylinder for making a fluid tight union of the cylinder and reservoir.

3. In a hydraulic brake mechanism in combination, a master cylinder, means for rigidly supporting said cylinder, a fluid reservoir communicating with, mounted on and supported by said cylinder, said reservoir having aligned openings in opposite ends to receive said cylinder, an outwardly turned flange at the margin of one of the openings fitted on said cylinder, the marginal portion of the reservoir about the other opening being seated on a portion of said cylinder, and means for clamping said reservoir in position.

4. In a hydraulic brake mechanism in combination, a sheet metal reservoir, said reservoir comprising a curved wall and two relatively flat opposite ends, there being horizontally aligned openings in said ends, reenforcing corrugations on said ends radiating from the aligned openings, a master cylinder communicating with said reservoir, means for rigidly supporting said cylinder, said cylinder being disposed partially within said reservoir and extending through the aligned openings, marginal portions on the reservoir about the openings seated on portions of said cylinder, and means for clampingly securing said reservoir in position.

5. In a hydraulic brake mechanism in combination, a sheet metal reservoir, said reservoir having horizontally aligned opposite openings therein, a master cylinder communicating with said reservoir, means for rigidly supporting said cylinder independently of said reservoir, said cylinder being disposed partially within said reservoir and extending through the aligned openings, marginal portions on the reservoir about the openings seated on said cylinder and means for clampingly securing said marginal portions in position.

6. In a hydraulic brake mechanism in combination, a sheet metal reservoir, said reservoir having horizontally aligned opposite openings therein, a master cylinder communicating with said reservoir, means for rigidly supporting said cylinder independently of said reservoir, said cylinder being disposed partially within said reservoir and extending through the aligned openings, marginal portions on the reservoir about the openings seated on said cylinder, means for clampingly securing said marginal portions in position, and gaskets interposed between the reservoir and the cylinder to effect a fluid tight seal.

WALLACE F. OLIVER.